United States Patent
Sohn et al.

(10) Patent No.: US 9,080,748 B2
(45) Date of Patent: Jul. 14, 2015

(54) DISPLAY PANEL HAVING IMPROVED LIGHT-USE EFFICIENCY, DISPLAY DEVICE INCLUDING THE DISPLAY PANEL, AND METHOD OF MANUFACTURING THE DISPLAY PANEL

(71) Applicant: Samsung Electronics Co., Ltd., Suwon-Si, Gyeonggi-Do (KR)

(72) Inventors: Jin-seung Sohn, Seoul (KR); Eun-hyoung Cho, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 156 days.

(21) Appl. No.: 13/849,703

(22) Filed: Mar. 25, 2013

(65) Prior Publication Data

US 2014/0140045 A1    May 22, 2014

(30) Foreign Application Priority Data

Nov. 20, 2012  (KR) .................. 10-2012-0131944

(51) Int. Cl.
*F21V 13/08*    (2006.01)
*G02F 1/1335*   (2006.01)

(52) U.S. Cl.
CPC .......... *F21V 13/08* (2013.01); *G02F 1/133528* (2013.01); *G02F 1/133553* (2013.01); *G02F 2001/133565* (2013.01); *G02F 2001/133607* (2013.01)

(58) Field of Classification Search
USPC .................. 362/19, 97.1, 97.2, 97.3, 600–634
See application file for complete search history.

(56) References Cited

U.S. PATENT DOCUMENTS

| | | | | |
|---|---|---|---|---|
| 5,890,796 | A * | 4/1999 | Marinelli et al. | 362/307 |
| 6,104,454 | A * | 8/2000 | Hiyama et al. | 349/65 |
| 7,738,056 | B2 | 6/2010 | Tsujimura et al. | |
| 7,965,357 | B2 | 6/2011 | Van De Witte et al. | |
| 8,638,499 | B2 * | 1/2014 | Mukawa | 359/630 |
| 2005/0286266 | A1 * | 12/2005 | Park | 362/615 |
| 2010/0225855 | A1 | 9/2010 | Lu | |
| 2011/0222002 | A1 | 9/2011 | Lee | |
| 2012/0236390 | A1 * | 9/2012 | Wang et al. | 359/291 |

FOREIGN PATENT DOCUMENTS

| | | |
|---|---|---|
| JP | 2009152207 A | 7/2009 |
| JP | 2009176437 A | 8/2009 |
| JP | 2009237008 A | 10/2009 |
| JP | 2011069896 A | 4/2011 |
| JP | 2012078852 A | 4/2012 |
| JP | 2012079460 A | 4/2012 |

(Continued)

OTHER PUBLICATIONS

Hoeji, K.H. et al., "Optical Simulation Study on the Performances of Collimating Films for LCD Backlight Applications," vol. 18, No. 6, Dec. 2007 and Abstract.

*Primary Examiner* — Laura Tso
(74) *Attorney, Agent, or Firm* — Harness, Dickey & Pierce, P.L.C.

(57) ABSTRACT

A display panel may include a plurality of opening regions controlling one of transmission and blocking of incident light to form an image, a non-opening region between the plurality of opening regions, the non-opening region configured to not transmit the incident light, and at least one oblique reflective plate in the non-opening region to obliquely reflect the incident light.

21 Claims, 5 Drawing Sheets

(56) References Cited

FOREIGN PATENT DOCUMENTS

| KR | 19990045004 | | 6/1999 |
|---|---|---|---|
| KR | 20020031566 | A | 5/2002 |
| KR | 100681764 | B1 | 2/2007 |
| KR | 20070016475 | A | 2/2007 |
| KR | 20070023512 | A | 2/2007 |
| KR | 100702665 | B1 | 4/2007 |
| KR | 20100131300 | A | 12/2010 |
| KR | 20110065043 | A | 6/2011 |

* cited by examiner

DISPLAY PANEL HAVING IMPROVED LIGHT-USE EFFICIENCY, DISPLAY DEVICE INCLUDING THE DISPLAY PANEL, AND METHOD OF MANUFACTURING THE DISPLAY PANEL

CROSS-REFERENCE TO RELATED APPLICATIONS

This application claims the benefit of Korean Patent Application No. 10-2012-0131944, filed on Nov. 20, 2012, in the Korean Intellectual Property Office, the disclosure of which is incorporated herein in its entirety by reference.

BACKGROUND

1. Field

Example embodiments relate to a display panel having improved light-use efficiency, a display device including the display panel, and a method of manufacturing the display panel, and more particularly, to a display panel which efficiently reuse light provided from a light source to improve light-use efficiency, a display device including the display panel, and a method of manufacturing the display panel.

2. Description of the Related Art

In a non-emissive type display device that needs an additional light source (e.g., a liquid crystal display device and a beam projector), liquid crystals are arranged between two sheets of polarizer to control transmission/blocking of light and thereby form an image. However, an absorptive polarizer which has been widely used only uses half of the light emitted from a light source and the rest of the light is absorbed by the polarizer. Therefore, light-use efficiency is relatively low and improving luminance of a display device is limited.

Therefore, there is an issue with non-emissive type display devices that require improvement of light-use efficiency and luminance. For instance, it has been proposed that a reflective polarizer reflecting the non-transmitted light, instead of an absorptive polarizer absorbing the not-transmitted light, be arranged between a display panel and a light source. If a polarization direction of the not-transmitted light reflected by a reflective polarizer is changed and the not-transmitted light is redirected toward the reflective polarizer, the not-transmitted light may be transmitted by the reflective polarizer. Therefore, the not-transmitted light may be reused, thereby improving light-use efficiency. Various research is being conducted to reduce loss of light in non-emissive type display devices.

SUMMARY

Example embodiments provide display panels having improved light-use efficiency and display devices including the display panels. Example embodiments also provide methods of manufacturing display panels having improved light-use efficiency.

Additional aspects will be set forth in part in the description which follows and, in part, will be apparent from the description, or may be learned by practice of example embodiments.

According to example embodiments, a display panel may include a plurality of opening regions controlling one of transmission and blocking of incident light to form an image, a non-opening region between the plurality of opening regions, the non-opening region configured to not transmit the incident light, and at least one oblique reflective plate in the non-opening region to obliquely reflect the incident light.

A polarizing plate may be in the plurality of opening regions. The polarizing plate may be adjacent to the at least one oblique reflective plate and only transmitting light of a specific polarization direction. The polarizing plate may be one of an absorptive polarizer and a reflective polarizer. The reflective polarizer may be a wire grid polarizer.

The at least one oblique reflective plate may include one continuous reflective surface that is sloped so as to obliquely reflect the incident light toward the plurality of opening regions. The one continuous reflective surface may be a flat surface. The one continuous reflective surface may be curved so that an angle of inclination increases as the one continuous reflective surface is located farther from the plurality of opening regions.

The at least one oblique reflective plate may include a plurality of discontinuous reflective surfaces. The plurality of discontinuous reflective surfaces may have different angles of inclination. The different angles of inclination of the plurality of discontinuous reflective surfaces may increase as the plurality of discontinuous reflective surfaces are located farther from the plurality of opening regions.

The at least one oblique reflective plate may include an array of reflective surfaces having one or a combination of shapes including a sawtooth, a triangle, a spherical surface, an aspherical surface, a cone, and a polypyramid. The array of reflective surfaces may have a same angle of inclination.

The display panel may further include at least one first polarizing plate in the plurality of opening regions on a rear substrate, the at least one oblique reflective plate in the non-opening region on the rear substrate, a polarization converting layer on the first polarizing plate, a switching element on the at least one oblique reflective plate, a second polarizing plate covering at least the polarization converting layer, a color filter on the polarization converting layer, and a black matrix on the switching element. The at least one first polarizing plate may be a plurality of first polarizing plates and the at least one oblique reflective plate may be a plurality of oblique reflective plates. The plurality of first polarizing plates and the plurality of oblique reflective plates may be alternately arranged on the rear substrate.

According to example embodiments, a display device may include the display panel configured to form an image using incident light, and a light source unit configured to provide light to the display panel.

According to example embodiments, a method of manufacturing a display panel may include forming a transparent resin layer on a transparent substrate, the transparent resin layer having a flat surface formed in an opening region and an oblique surface formed in a non-opening region, forming an oblique reflective surface in the non-opening region by forming a reflective metal layer on an entire surface of the transparent resin layer, and forming a wire grid polarizer by patterning the reflective metal layer in the opening region.

Forming the transparent resin layer may include forming a transparent liquid-phase resin material on the transparent substrate, the transparent liquid-phase resin material including one of a thermosetting transparent liquid-phase resin material and a photocurable liquid-phase resin material, contacting a stamp having an oblique surface pattern to the transparent liquid-phase resin material and pressing the stamp, and hardening the transparent liquid-phase resin material and removing the stamp having the oblique surface pattern.

Contacting the stamp may include using the stamp including a first surface corresponding to the non-opening region, the first surface having the oblique surface pattern embossed thereon, and a second surface corresponding to the opening region, the second surface being flat. Forming the oblique reflective surface may include forming the reflective metal layer of a conductive metal material.

Forming the wire grid polarizer may include applying a mask layer on an entire surface of the reflective metal layer, exposing a portion of the reflective metal layer by patterning the mask layer in the opening region using a stamp including a shape of the wire grid polarizer patterned thereon, and etching the exposed reflective metal layer and removing the mask layer. Exposing the portion may include using the stamp including a first surface corresponding to the opening region, the first surface having an embossed pattern of the wire grid polarizer, and a second surface corresponding to the non-opening region, the second surface being flat.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Hereinafter, a display panel having improved light-use efficiency, a display device including the display panel, and a method of manufacturing the display panel will be described in detail with reference to the accompanying drawings. Like reference numerals refer to like elements throughout. In the drawings, sizes of elements may be exaggerated for clarity. The embodiments described below are just examples and various modifications can be made thereto. When a layer is referred to as being "on" another layer or substrate, it can be directly on the other layer or substrate, or intervening layers may also be present.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

Parts having no relationship with the description are omitted for clarity, and the same or similar constituent elements are indicated by the same reference numeral throughout the specification.

It will be understood that, although the terms "first", "second", etc. may be used herein to describe various elements, components, regions, layers and/or sections, these elements, components, regions, layers and/or sections are not to be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments are not to be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, is to be interpreted as having a meaning that is consistent with their meaning in the context of the relevant art and will not be interpreted in an idealized or overly formal sense unless expressly so defined herein.

Figure 1:
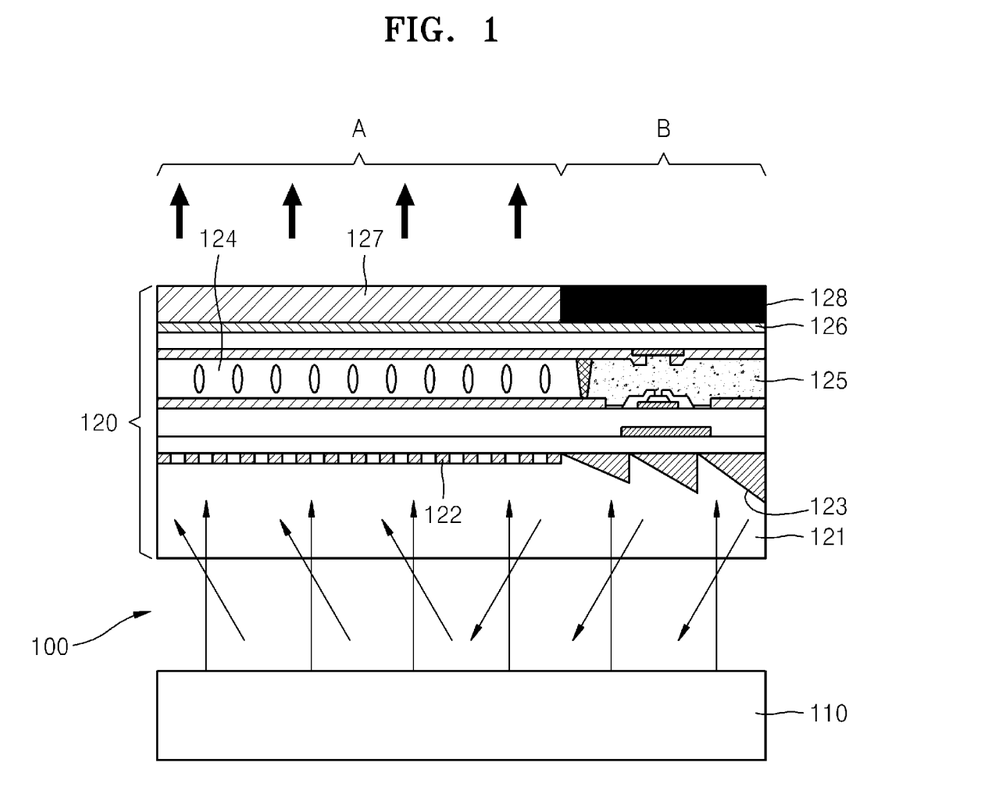
FIG. 1 is a schematic cross-sectional view illustrating structures of a display panel and display device according to example embodiments.

FIG. 1 is a schematic cross-sectional view illustrating structures of a display panel and display device according to example embodiments. Referring to FIG. 1, a display device 100 according to example embodiments may include a display panel 120 for forming an image using incident light and a light source unit 110 for providing light to the display panel 120.

For example, the light source unit 110 may be a backlight unit in which a plurality of point light sources (e.g., light emitting devices (LEDs)) or linear light sources (e.g., cold cathode fluorescent lamps (CCFLs)) are arranged. Although not illustrated, a diffusion plate for diffusing and homogenizing light beams and a reflective plate for reflecting light toward the display panel 120 may be further included in the light source unit 110.

The display panel 120 may include, for example, a rear substrate 121, a first polarizing plate 122 arranged on a partial region of an upper surface of the rear substrate 121, an oblique reflective plate 123 arranged on the remaining region of the upper surface of the rear substrate 121, a polarization converting layer 124 arranged on the first polarizing plate 122, a switching element 125 arranged on the oblique reflective plate 123, a second polarizing plate 126 arranged to cover at least the polarization converting layer 124, a color filter 127 arranged to oppose the polarization converting layer 124, and a black matrix 128 arranged to oppose the switching element 125.

The first polarizing plate 122 only transmits light with a specific polarization direction so that only the light with the specific polarization direction is incident to the polarization converting layer 124. The oblique reflective plate 123 adjacent to the first polarizing plate 122 obliquely reflects light incident from the light source unit 110 toward the light source unit 110. The polarization converting layer 124 changes or does not change a polarization direction of incident light according to an on/off state and may include, for example, liquid crystals. The switching element 125 controls on/off switching of the polarization converting layer 124 and may include, for example, a thin film transistor (TFT).

The polarization converting layer 124 and the switching element 125 may be adjacent to each other on the same layer. The second polarizing plate 126 only transmits light with a specific polarization direction from among light that has passed through the polarization converting layer 124. The color filter 127 imparts color to the light passing through the polarization converting layer 124 and may be, for example, a red, green, or blue filter. The black matrix 128 may prevent or reduce a circuit configuration in the display panel 120, for example, the switching element 125, from being seen from outside the device and protects the switching element 125 from external light.

In the display panel 120 illustrated in FIG. 1, according to the on/off state of the polarization converting layer 124, a polarization direction may be changed so that light emitted from the light source unit 110 may be transmitted or blocked by the display panel 120. Therefore, only an opening region A corresponding to the polarization converting layer 124 and color filter 127 may control transmission/blocking of incident light so as to contribute to forming of an image. On the contrary, a non-opening region B corresponding to the switching element 125 and black matrix 128 may not contribute to forming of an image. Therefore, light incident to the non-opening region B from among the light emitted from the light source unit 110 may not form an image, and thus light-use efficiency may decrease. Moreover, as resolution of the display panel 120 increases, an area of the opening region A decreases with respect to the whole area, and thus light-use efficiency may decrease more.

The display panel 120 according to example embodiments may include the oblique reflective plate 123 in the non-opening region B in order to improve light-use efficiency. In particular, the oblique reflective plate 123 may be arranged under the switching element 125 to which the light emitted from the light source unit 110 is directly incident. As illustrated in FIG. 1, the light emitted from the light source unit 110 may be obliquely reflected by the oblique reflective plate 123 toward the light source unit 110. As described above, the light source unit 110 further includes a reflective plate (not illustrated) reflecting light toward the display panel 120. Therefore, light incident to the light source unit 110 may be obliquely reflected by the reflective plate in the light source unit 110 toward the first polarizing plate 122 arranged in the opening region A. As a result, light incident to the non-opening region B from among the light emitted from the light source unit 110 may be made re-incident to the opening region A by the oblique reflective plate 123, and thus light-use efficiency may be improved.

The light emitted from the light source unit 110 has a Lambertian distribution. Therefore, if a reflective plate parallel to a surface of the light source unit 110 is arranged in the non-opening region B, most of the light may be repeatedly reflected between reflective plates and then may be dissipated. In particular, because reflectance of the reflective plate arranged in the light source unit 110 is less than about 70% to 80%, only a few incidences of light reflection may completely dissipate light. Because the display panel 120 according to example embodiments uses the oblique reflective plate 123 instead of a parallel reflective plate, most of light incident to the non-opening region B from the light source unit 110 may be efficiently reused. Therefore, light-use efficiency and luminance of the non-emissive type display device 100 including the display panel 120 according to example embodiments may be improved.

In order to improve light-use efficiency even more, the first polarizing plate 122 may be a reflective polarizing plate. For example, the first polarizing plate 122 may be a reflective polarizing film (e.g., a dual brightness enhancement film (DBEF)) or may be a wire grid polarizer (WGP). In a wire grid polarizer, a plurality of conductive metal wires are arranged in parallel with each other at regular intervals. If an arranging period of the metal wires is greater than a wavelength of incident light, a typical diffraction phenomenon occurs. However, if the period is smaller than the wavelength of the incident light, light polarized in parallel with the metal wires is reflected and light polarized vertically to the metal wires is transmitted.

If the first polarizing plate 122 is a reflective polarizing plate, light reflected from the first polarizing plate 122 without being transmitted thereby is reflected from the light source unit 110 by changing a polarization direction, thereby enabling reuse of the light. However, example embodiments are not limited thereto, and typical absorptive polarizing plates may be used as both of the first and second polarizing plates 122 and 126.

For convenience, FIG. 1 only illustrates a single pixel part of the display panel 120. Actually, the display panel 120 includes an array of a plurality of two-dimensionally arranged pixels, and thus the display panel 120 may include a plurality of opening regions A for forming an image by controlling transmission/blocking of incident light and a plurality of non-opening regions B arranged between the plurality of opening regions B in order not to transmit the incident light.

Figure 2:
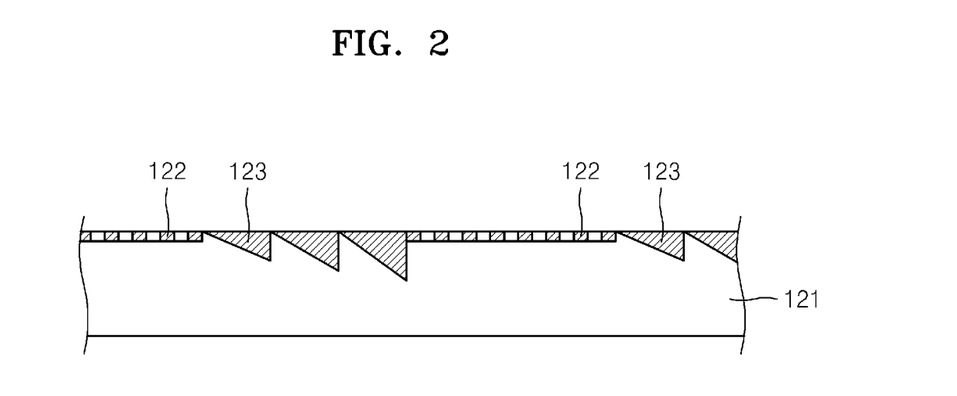
FIG. 2 is a cross-sectional view illustrating a part of a rear substrate of the display panel of FIG. 1 in detail.

Accordingly, on the rear substrate 121, a plurality of polarizing plates 122 respectively arranged in the plurality of opening regions A and a plurality of oblique reflective plates 123 arranged in the plurality of non-opening regions B may be alternately arranged. For example, FIG. 2 illustrates that two first polarizing plates 122 and two oblique reflective plates 123 are alternately arranged on the rear substrate 121. Although FIG. 2 only illustrates two pixel parts, more first polarizing plates 122 and oblique reflective plates 123 may be arranged on the rear substrate 121.

FIGS. 1 and 2 illustrate that the oblique reflective plate 123 has, for example, a plurality of identical reflective surfaces having the shape of saw teeth. However, the number and shapes of oblique reflective plates 123 are not limited thereto. The shapes and sizes of reflective surfaces of oblique reflective plates 123 may be differently designed according to various factors, for example, a distance between the oblique reflective plate 123 and the light source unit 110, a width of the opening region A, and a width of the non-opening region B.

Figure 3:
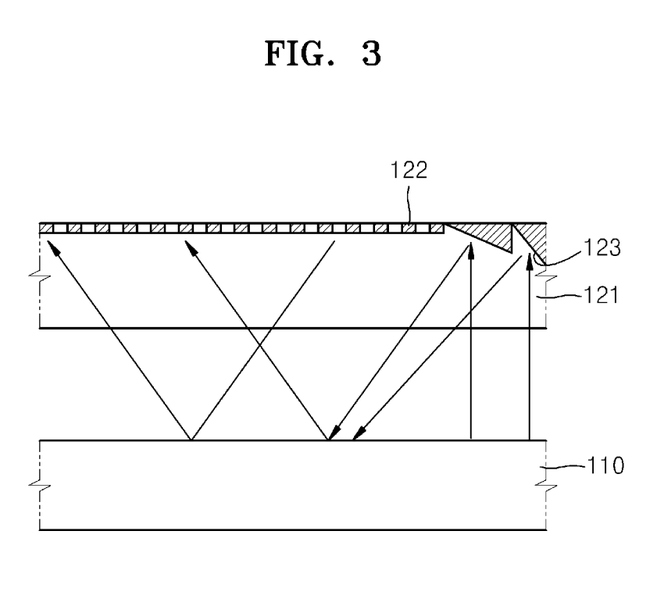
FIG. 3 is a schematic cross-sectional view illustrating a structure of an oblique reflective surface of a display panel according to example embodiments.

For example, as illustrated in FIG. 3, the oblique reflective plate 123 may include a plurality of sawtooth-like reflective surfaces having different angles of inclination. For example, in a single pixel, an angle of inclination may increase as a reflective surface is located farther from the opening region A.

Figure 4A:
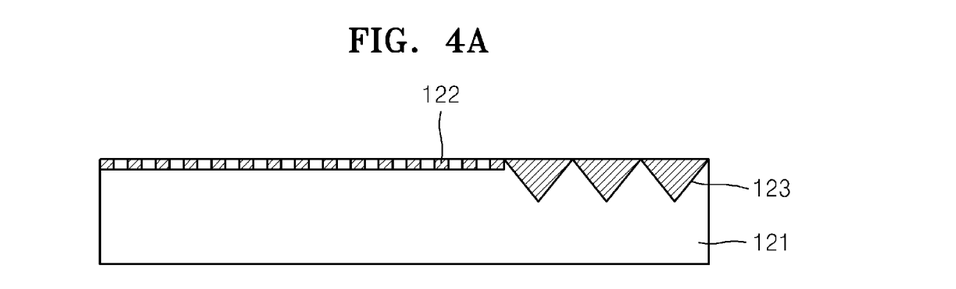
FIGS. 4A to 4D are schematic cross-sectional views illustrating a structure of an oblique reflective surface of a display panel according to example embodiments.
Figure 4B:
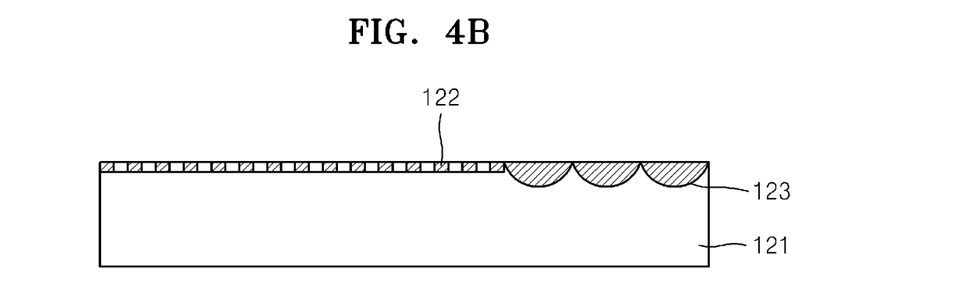

The oblique surfaces may have other various shapes besides the shape of a sawtooth. For example, FIGS. 4A to 4D are schematic cross-sectional views illustrating various structures of oblique reflective surfaces of a display panel. As illustrated in FIG. 4A, the oblique reflective plate 123 may include a plurality of reflective surfaces having shapes of isosceles triangles. Although FIG. 4A illustrates that a plurality of reflective plates of the oblique reflective plate 123 have the same shape as the isosceles triangle, the oblique reflective plate 123 may include reflective surfaces having shapes of general triangles with different sizes and shapes. As illustrated in FIG. 4B, the oblique reflective plate 123 may include a plurality of reflective surfaces having shapes of semicircles.

Besides, the oblique reflective plate 123 may include an array of reflective surfaces having one or combination of shapes (e.g., a spherical surface, aspherical surface, cone, and polypyramid). These reflective surfaces may have the same angle of inclination, but may different angles of inclination according to positions. For example, the reflective surfaces may be formed such that angles of inclination thereof increase as the reflective surfaces are located farther from the opening region A in a single pixel.

Figure 4C:
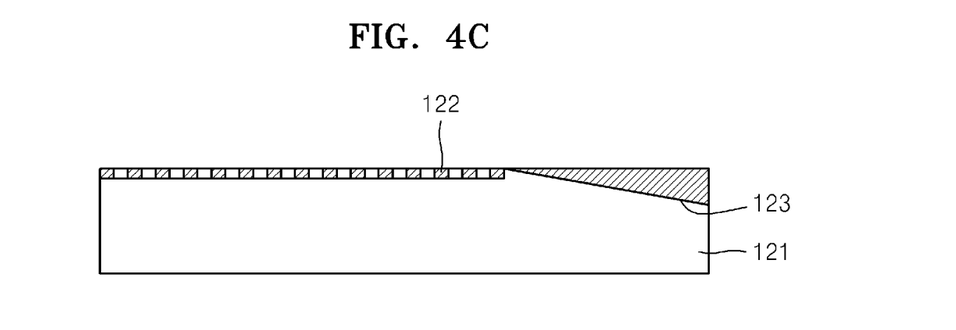
Figure 4D:
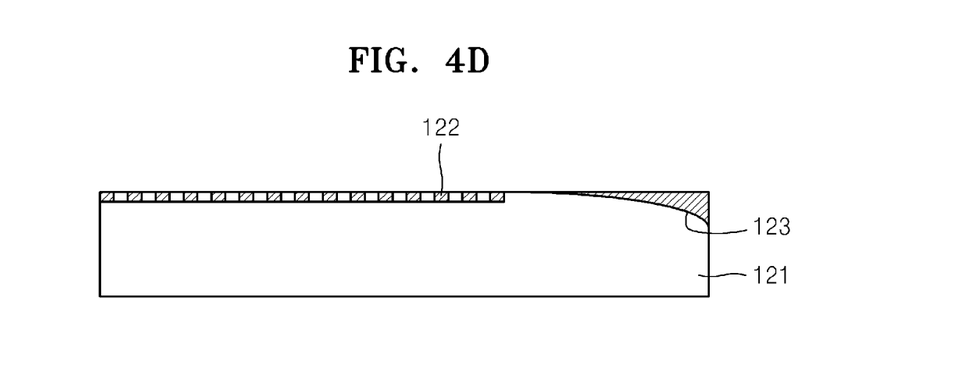

The above-described oblique reflective plate 123 includes a plurality of reflective surfaces having discontinuous shapes, but may include a single continuous reflective surface. For example, as illustrated in FIG. 4C, the oblique reflective plate 123 may include a single continuous reflective surface that is inclined to reflect light toward the opening region A. As illustrated in FIG. 4D, the oblique reflective plate 123 may include a curved continuous reflective surface instead of the planar inclined reflective surface illustrated in FIG. 4C. In example embodiments, the curved surface may be formed such that an angle of inclination thereof increases as the surface is located farther from the opening region A in a single pixel.

In the case of using a wire grid polarizer as the first polarizing plate 122, the first polarizing plate 122 and the oblique reflective plate 123 may be simultaneously formed on an upper surface of the rear substrate 121. FIGS. 5A to 5E are schematic cross-sectional views illustrating a method of manufacturing the display panel 120 for simultaneously forming the first polarizing plate 122 and the oblique reflective plate 123 according to example embodiments.

Figure 5A:
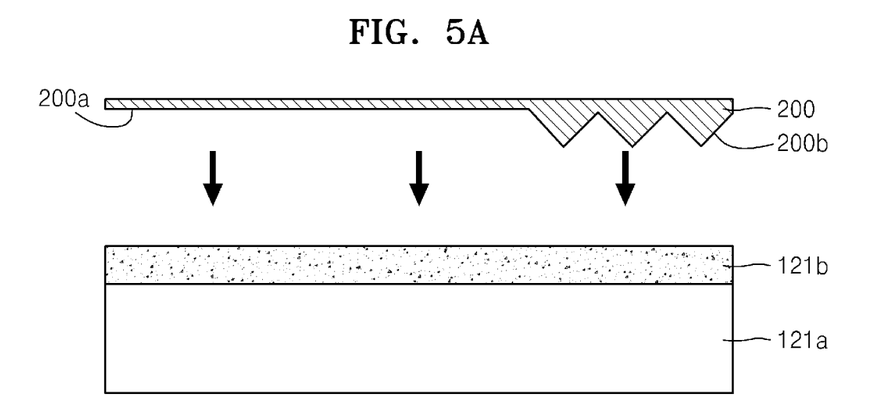
FIGS. 5A to 5E are schematic cross-sectional views illustrating a method of manufacturing a display panel according to example embodiments.

Referring to FIG. 5A, a transparent resin layer 121b may be formed by spin-coating a thermosetting or photocurable transparent liquid-phase resin material, for example, hydrogen silsesquioxane (HSQ), onto a transparent substrate 121a to a certain thickness. After forming the transparent resin layer 121b, a stamp 200 in which a shape of the oblique reflective plate 123 is patterned makes contact with the liquid-phase transparent resin layer 121b and pressed.

As illustrated in FIG. 5A, if the shape of the oblique reflective plate 123 is embossed only at a partial surface 200b of the stamp 200 which corresponds to the non-opening region B, the remaining surface 200a of the stamp 200 which corresponds to the opening region A is a flat surface. While the stamp 200 is pressed against the liquid-phase transparent resin layer 121b, this structure is heated at a temperature of about 90° C. to vaporize solvent contained in the HSQ, and then hard baking may be performed at a temperature of about 350° C.

The transparent resin layer 121b is hardened, thereby forming oblique surfaces having the same shape as the pattern of the surface 200b of the stamp 200 in the non-opening region B and planarizing a surface of the transparent resin layer 121b which corresponds to the opening region A. The transparent substrate 121a and the transparent resin layer 121b may form the rear substrate 121 together.

Figure 5B:
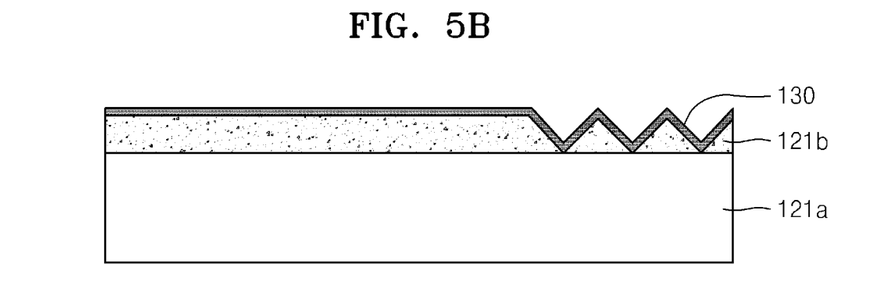

Referring to FIG. 5B, a metal layer 130 having improved reflectivity may be deposited on the whole surface of the transparent resin layer 121b. The metal layer 130 deposited on oblique surfaces of the transparent resin layer 121b serves as a reflective surface for reflecting light, and the metal layer 130 deposited on a flat surface of the transparent resin layer 121b serves as a wire grid polarizer after undergoing a later process. To this end, the metal layer 130 may be formed of metal materials having improved reflectivity and conductivity. For example, the metal layer 130 may be formed of aluminum (Al). The reflective surfaces illustrated in FIG. 4A are also illustrated in FIG. 5B. However, the other reflective surfaces illustrated in FIGS. 1, 3, and 4B to 4D may be formed in the same manner.

Figure 5C:
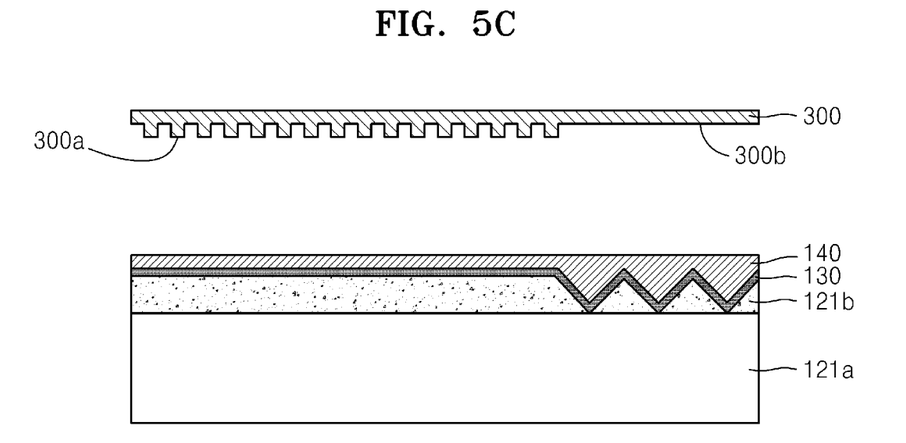

Thereafter, by patterning the metal layer 130 deposited on the opening region A, a wire grid polarizer may be formed. For example, the metal layer 130 may be patterned by using a nano-imprint technology. To this end, as illustrated in FIG. 5C, a mask layer 140 is overall applied onto the metal layer 130. A stamp 300 in which a shape of a wire grid polarizer is patterned is contacted to the mask layer 140 and is pressed to thereby pattern the mask layer 140 in the shape of the wire grid polarizer. In the case of the stamp 300, the shape of the wire grid polarizer is embossed only at a partial surface 300a corresponding to the opening region A and a surface 300b corresponding to the non-opening region B is a flat surface.

Figure 5D:
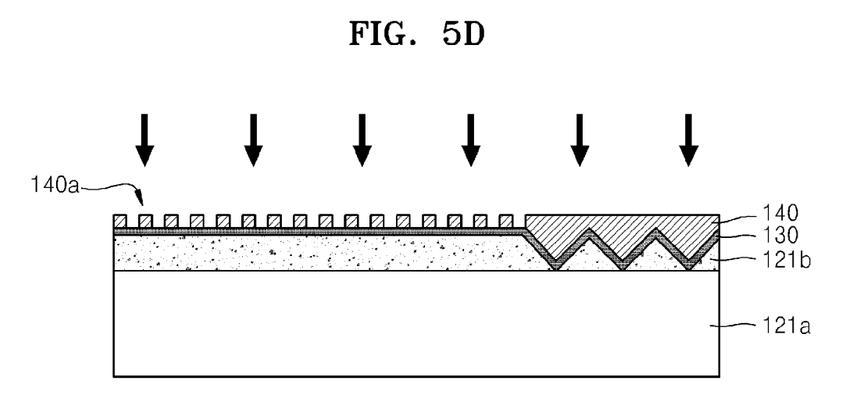

As illustrated in FIG. 5D, a part of the metal layer 130 may be exposed through openings between patterns 140a formed when the mask layer 140 in the opening region A is patterned. Thereafter, after etching the exposed metal layer 130 by using an etching method, e.g., inductively coupled plasma reactive etching (ICP-RIE), the remaining mask layer 140 is removed.

Figure 5E:
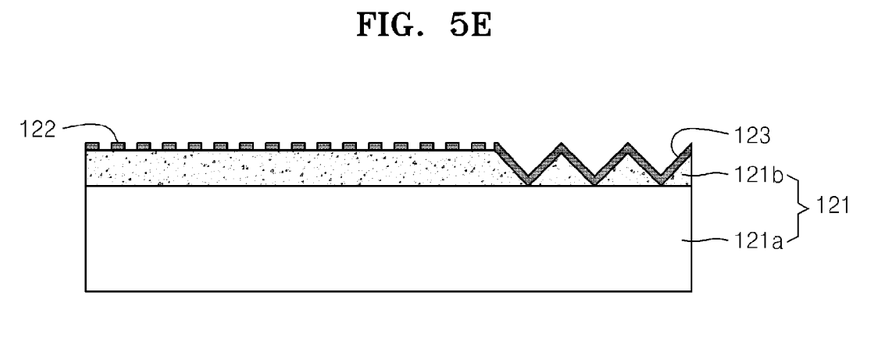

As illustrated in FIG. 5E, a wire-grid-polarizer-type first polarizing plate 122 may be formed in the opening region A on the transparent resin layer 121b. Therefore, according to example embodiments, it is possible to simultaneously form the first polarizing plate 122 in the opening region A and the oblique reflective plate 123 in the non-opening region B on the rear substrate 121.

After manufacturing the rear substrate 121 having the first polarizing plate 122 and oblique reflective plate 123 as described above, by forming the other elements (e.g., the polarization converting layer 124 and switching element 125) on the rear substrate 121 according to a typical display panel manufacturing method, manufacturing the display panel 120 may be completed.

It should be understood that example embodiments described therein should be considered in a descriptive sense only and not for purposes of limitation. Descriptions of features or aspects within each embodiment should typically be considered as available for other similar features or aspects in other embodiments.

What is claimed is:
1. A display panel comprising:
a plurality of opening regions configured to be switched between a first state transmitting incident light and a second state blocking the incident light to form an image;
a non-opening region between the plurality of opening regions, the non-opening region configured to not transmit the incident light; and
at least one oblique reflective plate in the non-opening region to obliquely reflect the incident light.

2. The display panel of claim 1, further comprising:
a polarizing plate in the plurality of opening regions, the polarizing plate adjacent to the at least one oblique reflective plate and only transmitting light of a specific polarization direction.

3. The display panel of claim 2, wherein the polarizing plate is one of an absorptive polarizer and a reflective polarizer.

4. The display panel of claim 3, wherein the reflective polarizer is a wire grid polarizer.

5. The display panel of claim 1, wherein the at least one oblique reflective plate includes one continuous reflective surface that is sloped so as to obliquely reflect the incident light toward the plurality of opening regions.

6. The display panel of claim 5, wherein the one continuous reflective surface is a flat surface.

7. The display panel of claim 5, wherein the one continuous reflective surface is curved so that an angle of inclination increases as the one continuous reflective surface is located farther from the plurality of opening regions.

8. The display panel of claim 1, wherein the at least one oblique reflective plate includes a plurality of discontinuous reflective surfaces.

9. The display panel of claim 8, wherein the plurality of discontinuous reflective surfaces have different angles of inclination.

10. The display panel of claim 9, wherein the different angles of inclination of the plurality of discontinuous reflective surfaces increase as the plurality of discontinuous reflective surfaces are located farther from the plurality of opening regions.

11. The display panel of claim 8, wherein the at least one oblique reflective plate includes an array of reflective surfaces having one or a combination of shapes including a sawtooth, a triangle, a spherical surface, an aspherical surface, a cone, and a polypyramid.

12. The display panel of claim 11, wherein the array of reflective surfaces have a same angle of inclination.

13. The display panel of claim 1, further comprising:
at least one first polarizing plate in the plurality of opening regions on a rear substrate;
the at least one oblique reflective plate in the non-opening region on the rear substrate;
a polarization converting layer on the first polarizing plate;
a switching element on the at least one oblique reflective plate;
a second polarizing plate covering at least the polarization converting layer;
a color filter on the polarization converting layer; and
a black matrix on the switching element.

14. The display panel of claim 13, wherein the at least one first polarizing plate is a plurality of first polarizing plates and the at least one oblique reflective plate is a plurality of oblique reflective plates, the plurality of first polarizing plates and the plurality of oblique reflective plates being alternately arranged on the rear substrate.

15. A display device comprising:
the display panel of claim 1, the display panel configured to form an image using incident light; and
a light source unit configured to provide light to the display panel.

16. A method of manufacturing a display panel, the method comprising:
forming a transparent resin layer on a transparent substrate, the transparent resin layer having a flat surface formed in an opening region and an oblique surface formed in a non-opening region;
forming an oblique reflective surface in the non-opening region by forming a reflective metal layer on an entire surface of the transparent resin layer; and
forming a wire grid polarizer by patterning the reflective metal layer in the opening region.

17. The method of claim 16, wherein the forming a transparent resin layer comprises:
forming a transparent liquid-phase resin material on the transparent substrate, the transparent liquid-phase resin material including one of a thermosetting transparent liquid-phase resin material and a photocurable liquid-phase resin material;
contacting a stamp having an oblique surface pattern to the transparent liquid-phase resin material and pressing the stamp; and
hardening the transparent liquid-phase resin material and removing the stamp having the oblique surface pattern.

18. The method of claim 17, wherein the contacting a stamp comprises using the stamp including a first surface corresponding to the non-opening region, the first surface having the oblique surface pattern embossed thereon, and a second surface corresponding to the opening region, the second surface being flat.

19. The method of claim 16, wherein the forming an oblique reflective surface comprises forming the reflective metal layer of a conductive metal material.

20. The method of claim 16, wherein the forming a wire grid polarizer comprises:
applying a mask layer on an entire surface of the reflective metal layer;
exposing a portion of the reflective metal layer by patterning the mask layer in the opening region using a stamp including a shape of the wire grid polarizer patterned thereon; and
etching the exposed reflective metal layer and removing the mask layer.

21. The method of claim 20, wherein the exposing a portion comprises using the stamp including a first surface corresponding to the opening region, the first surface having an embossed pattern of the wire grid polarizer, and a second surface corresponding to the non-opening region, the second surface being flat.

* * * * *